(12) United States Patent
Hanamura et al.

(10) Patent No.: US 7,500,660 B2
(45) Date of Patent: Mar. 10, 2009

(54) VEHICLE STABILIZER FOR HIGH STRESS

(75) Inventors: Teruhisa Hanamura, Ichihara (JP); Hidetaka Narishima, Ichihara (JP); Takashi Yajima, Ichihara (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 88 days.

(21) Appl. No.: 10/569,787

(22) PCT Filed: Aug. 20, 2004

(86) PCT No.: PCT/JP2004/012011

§ 371 (c)(1),
(2), (4) Date: Oct. 4, 2006

(87) PCT Pub. No.: WO2005/018966

PCT Pub. Date: Mar. 3, 2005

(65) Prior Publication Data

US 2007/0063473 A1    Mar. 22, 2007

(30) Foreign Application Priority Data

Aug. 26, 2003    (JP) .............................. 2003-301402

(51) Int. Cl.
*F16F 1/14*    (2006.01)
(52) U.S. Cl. ................. 267/273; 267/154; 267/188
(58) Field of Classification Search ............... 267/154, 267/188, 273; 72/128
See application file for complete search history.

(56) References Cited

U.S. PATENT DOCUMENTS 4,231,555 A * 11/1980 Saito .......................... 267/154

(Continued)

FOREIGN PATENT DOCUMENTS

JP            56042741 A     4/1981

(Continued)

OTHER PUBLICATIONS

European Search Report, EP 04 77 1972, Nov. 7, 2006, The Hague.

(Continued)

*Primary Examiner*—Christopher P Schwartz
(74) *Attorney, Agent, or Firm*—Fay Sharpe LLP (57) ABSTRACT

To provide a vehicle stabilizer for high stress in which fatigue life of a bending portion can be prolonged and which can exhibit excellent durability. A configuration of a bending portion 16, to which a maximum stress is applied and which is the most fragile part, of a vehicle stabilizer for high stress 10 is formed in a state which satisfies conditions: $0 < \phi \leq 4$ and $(\phi \times d/R) \leq 2$ wherein d represents a material diameter before bending process, R represents a radius of bending of the bending portion 16, d1 represents a short axis dimension of a cross section of the bending portion 16, d2 represents a long axis dimension of a cross section of the bending portion 16, and a flat rate $\phi$ of a cross section of the bending portion 16 is represented by the following equation: $\phi = (d2-d1)/d2 \times 100$. Accordingly, concentration of shearing stress on the bending portion 16 during a load input can be suppressed to prevent the vehicle stabilizer for high stress 10 from being broken due to the concentration of stress on the bending portion 16.

2 Claims, 9 Drawing Sheets

U.S. PATENT DOCUMENTS

| | | | |
|---|---|---|---|
| 5,491,996 A * | 2/1996 | Baarman et al. | 72/128 |
| 5,598,735 A | 2/1997 | Saito et al. | |
| 6,318,710 B1 * | 11/2001 | Anderson et al. | 267/273 |
| 2002/0170177 A1 * | 11/2002 | Koyama et al. | 29/897.2 |

FOREIGN PATENT DOCUMENTS

| | | |
|---|---|---|
| JP | 06041937 A | 2/1994 |
| JP | 06041937 U | 6/1994 |
| JP | 07215038 A | 8/1995 |
| JP | 08142632 A | 6/1996 |
| JP | 10324137 A | 12/1998 |
| JP | 2000-017390 | 1/2000 |
| JP | 2000024737 A | 1/2000 |
| JP | 2002-283824 | 10/2002 |

OTHER PUBLICATIONS

The Society of Automotive Engineers of Japan, *Automotive Engineers' Handbook*, vol. 2 Design Compilation, 1st Edition, 2nd printing, Jun. 1992, pp. 476-477.

The Society of Automotive Engineers of Japan, *Automotive Engineers' Handbook*, 8th Edition, May 1981 May, Compilation 7, p. 23.

Sekiji Inoue, "Chuukuu stabilizer no Sekkei (Design of Hollow Stabilizer)", Paper of Springs, the 28th version, Japan Spring Manufacturers Associateion, Mar. 31, 1983, pp. 46-54.

The Japan Society of Mechanical Engineers, "Kikai Kogaku Binran (Mechanical Engineers' Handbook)", May 31, 1990, Shinpan, 4th print, pp. B2-112 to B2-113, 4.2.9, paragraphs b and f.

* cited by examiner

VEHICLE STABILIZER FOR HIGH STRESS

FIELD OF THE INVENTION

The present invention relates to a solid vehicle stabilizer for high stress, the stabilizer being applicable under high stress, that is able to reduce an amount in which a vehicle body is rolled during a turning of a vehicle such as an automobile, and improves riding comfort for a vehicle passenger, and enhances stability of the vehicle body.

BACKGROUND ART

Typically, in order to reduce an amount of a vehicle roll that occurs during a vehicle cornering, a vehicle such as an automobile is provided with a stabilizer that is formed by conducting a hot-bending process on a spring steel material or the like (see Document 1).

Such a stabilizer has a complicated configuration in which a plurality of points at a lengthwise intermediate portion of the stabilizer is bent in order to avoid the stabilizer from interfering with a lower portion and a suspension of a vehicle body when the stabilizer is attached to a vehicle. However, generally, the stabilizer comprises a torsion portion that is existed to extend in a vehicle widthwise direction in a state of being attached to the vehicle and arm portions extending respectively from both left and right end portions of the torsion portion in a front and back direction of the vehicle. Further, a continuous portion spanning between the torsion portion and each of the arm portions is formed into a circular arc shape and is provided with a bending portion.

Here, the torsion portion is connected at the vehicle body side through a rubber bush, a bracket or the like. Link members are also connected to tip end portions of the arm portions by using bolts or the like, and the arm portions are connected, via the link members, to each member at a side of an axle such as a suspension arm or the like. Then, during a vehicle cornering, vertical loads in directions opposite to each other are applied to the tip end portions of the respective arm portions so that the respective arm portions are deflected in directions opposite to each other, and the torsion portion is twisted due to a moment. Accordingly, this stabilizer is structured to allow a resilient reaction force to act on the member at the axle side and, suppress the roll of the vehicle body.

Therefore, high load is repeatedly applied to such a stabilizer, which causes a problem with durability such as fatigue life. In particular, a maximum stress that is applied to the stabilizer tends to generate on the bending portion. However, generally, due to contacting with a mold during the hot-bending process, a flat portion, what is called, a "tool mark" is formed at the bending portion, therefore, the cross section of the bending portion is made flat to form a substantially D-shape. For this reason, when the stabilizer is actually attached to a vehicle for practical use, stress is often concentrated on the "tool mark" of the bending portion, which often causes the stabilizer to be broken due to the concentration of stress. Accordingly, in order to improve the durability of the stabilizer, fatigue life of the bending portion must be maintained as long as possible.

In particular, due to an increase of family of a vehicle having a large vehicle height such as a so-called SUV (sports utility vehicle), high roll rigidity of the stabilizer is highly required. Further, in order to obtain a crushable zone in the vehicle, it is also required that arm portions should be made as short as possible. For this reason, there is a tendency that stress applied to the-bending portion increases more and more. Consequently, in such a stabilizer used under high stress as described above, further improvement in durability is required. (Document 1: Japanese Patent Application Laid-Open (JP-A) No. 7-215038)

Disclosure of the Invention

Problems to be Solved by the Invention

In view of the aforementioned facts, an object of the present invention is to provide a vehicle stabilizer for high stress in which fatigue life of a bending portion can be prolonged and which can exhibit excellent durability.

Means for Solving the Problems

In order solve the aforementioned problems, the present invention is a vehicle stabilizer for high stress that is formed by conducting a hot-bending process on a solid round steel bar material, wherein a bending portion is molded in a state which satisfies conditions:

$$0 < \phi \leq 4 \text{ and } (\phi \times d/R) \leq 2,$$

in which d represents a material diameter of the solid round steel bar material, R represents a radius of bending of the bending portion, d1 represents a short axis dimension of a cross section of the bending portion, d2 represents a long axis dimension of the cross section of the bending portion, and a flat rate $\phi$ of the cross section of the bending portion is represented by the following equation:

$$\phi = (d2-d1)/d2 \times 100.$$

The present invention is the vehicle stabilizer for high stress in which a radius of bending R, a flat rate $\phi$ of a cross section of the bending portion, and a material diameter d before the bending process are set within predetermined ranges of values at the bending portion on which a maximum stress is generally applied and which is a most fragile portion. Here, the material diameter d, and the radius of bending R of the bending portion are values independently determined for each vehicle family. Namely, in the vehicle stabilizer for high stress of the present invention, the flat rate $\phi$ of a cross section of the bending portion is determined within a predetermined range of values on the basis of values of the predetermined material diameter d and the radius of bending R of the bending portion. Consequently, it becomes possible to prevent concentration of stress, i.e., shearing stress, occurred at the bending portion when the load is inputted thereto and prevent the vehicle stabilizer from being broken at the bending portion due to the concentration of stress at the bending portion.

Further, the present invention is the vehicle stabilizer for high stress, wherein the vehicle stabilizer for high stress is used under stress of 500 MPa or more.

Effects of the Invention

As described above, the vehicle stabilizer for high stress according to the present invention can prolong fatigue life of the bending portion, and improve durability.

BEST MODE FOR CARRYING OUT THE INVENTION

Figure 1:
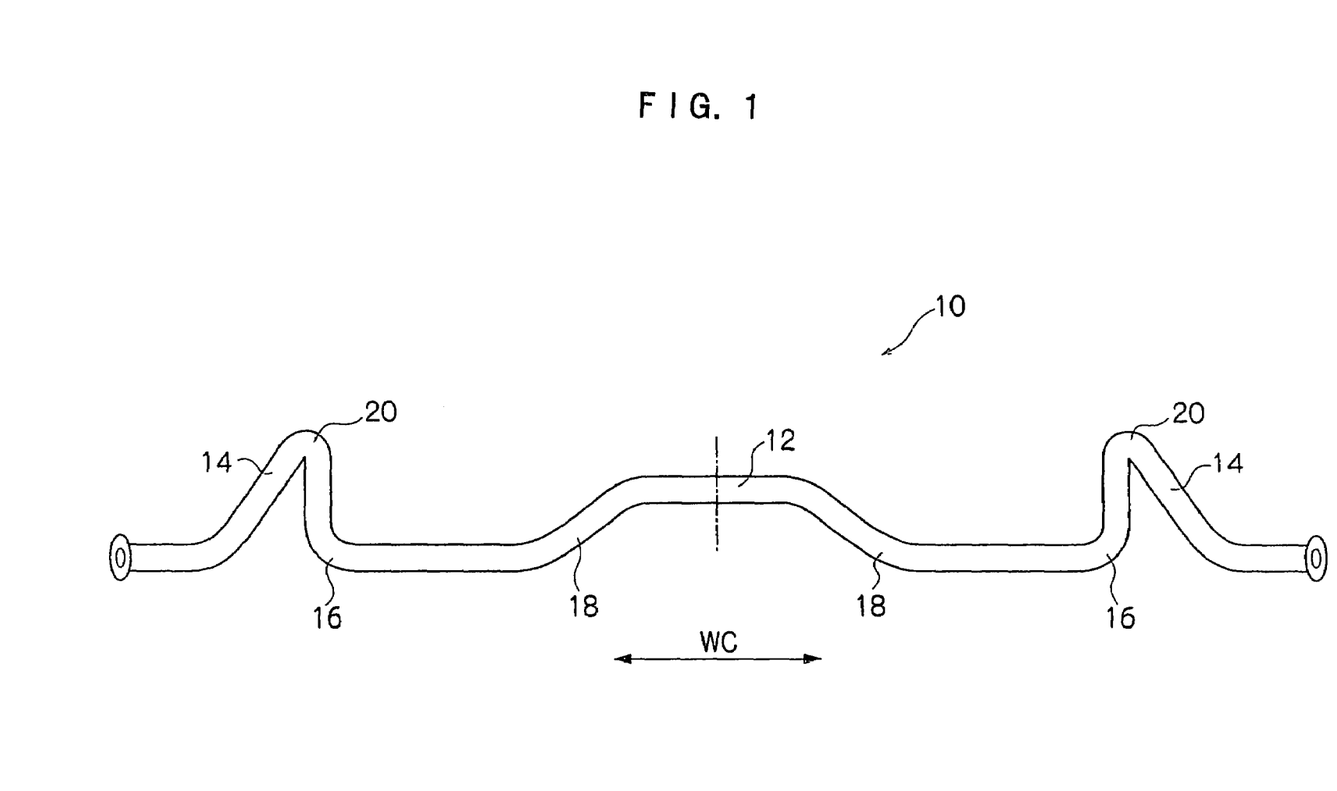
FIG. 1 is a front view showing a vehicle stabilizer for high stress according to an embodiment of the present invention.
Figure 2:
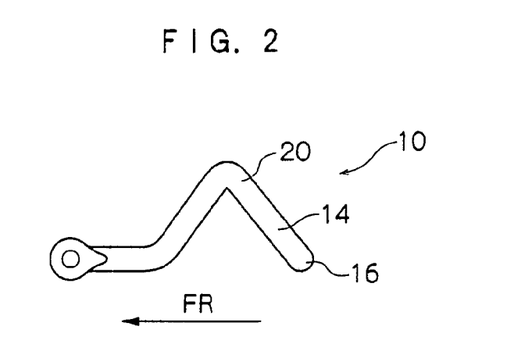
FIG. 2 is a side view showing the vehicle stabilizer for high stress according to the present embodiment.

FIG. 1 shows a front view of a vehicle stabilizer for high stress 10 (hereinafter, stabilizer 10) according to an embodiment of the present invention. Further, FIG. 2 shows a side view of the stabilizer 10.

The stabilizer 10 is molded such that a hot-bending process is conducted on a solid round steel bar, and immediately, a quench-and-temper process is conducted thereon, and is adapted for the use under high stress of 500 MPa or more. This stabilizer 10 is formed into a complicated configuration in which a plurality of portions is bent at an intermediate portion in a lengthwise direction of the stabilizer 10 in order to avoid the stabilizer 10 from interfering with a lower structure and a suspension of a vehicle body when attached to a vehicle. The stabilizer 10 comprises, in a state of being attached to the vehicle, a torsion portion 12 extending in a widthwise direction (in a direction of arrow WC) of a vehicle and arm portions 14 extending from both left and right end portions of the torsion portion 12 in a front and back direction of a vehicle (in a direction of arrow FR). Two bending portions 18, each of which is bent in a crank shape, are provided at lengthwise intermediate portions of the torsion portion 12. Bending portions 20, each of which is bent in a circular arc shape, are provided respectively at a lengthwise intermediate portion of the arm portions 14. Bending potions 16, each of which is formed in a circular arc shape, are provided at continuous portions, each of which is formed between the torsion portion 12 and each arm portion 14.

Figure 3:
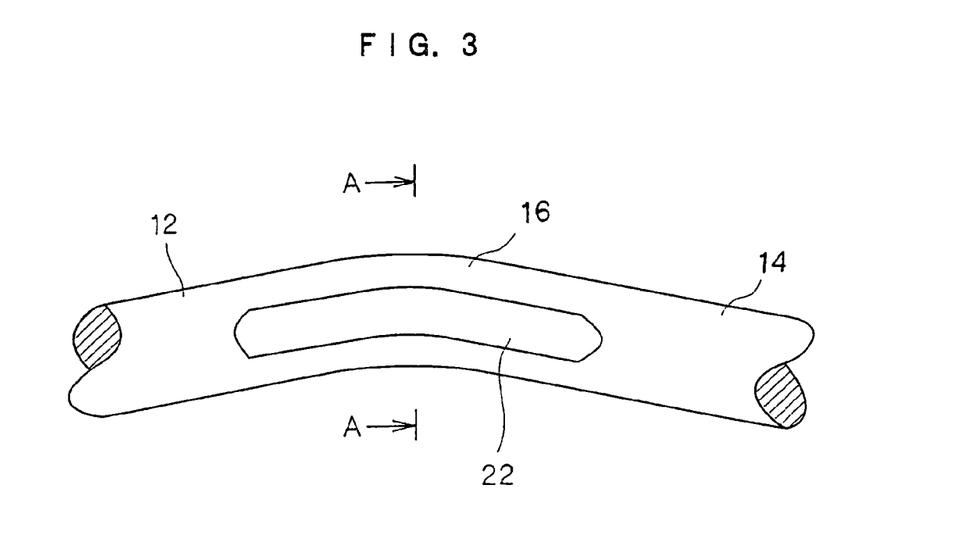
FIG. 3 is a perspective view showing a structure of a bending portion of the vehicle stabilizer for high stress according to the present embodiment.
Figure 4:
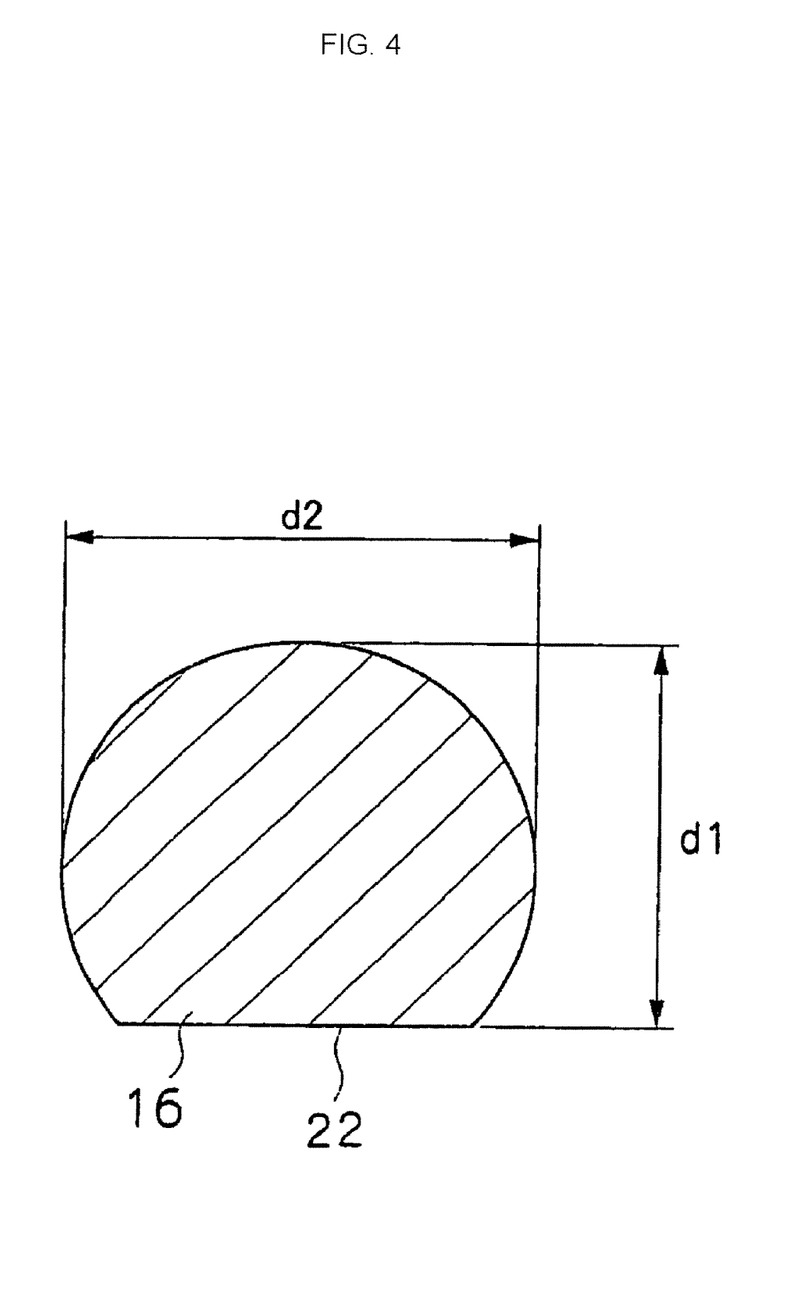
FIG. 4 is a cross-sectional view taken along a line A-A of FIG. 3.

As shown in FIGS. 3 and 4, a flat portion, what we call, "tool mark" 22 is formed at an outer periphery of each bending portion 16 due to contacting with a mold during the hot-bending process, and a cross section of the bending portion 16 is made flat to have substantially D shape. Further, although it is not shown, tool marks are also formed at the bending portions 18 and 20 in the same manner as in the bending portion 16. In order to simplify the explanation of bending portions, the bending portion 16 is representatively exemplified and a description thereof will be made, hereinafter.

In the stabilizer 10, the bending portion 16 is formed into a state which satisfies conditions:

$$0 < \phi \leq 4, \text{ and } (\phi \times d/R) \leq 2,$$

wherein d represents a (material) diameter of the solid round steel bar material, R represents a radius of bending of the bending portion 16, d1 represents a short axis dimension of a cross section of the bending portion 16, and d2 represents a long axis demension of the cross section of the bending portion 16, and a flat rate φ of the cross section of the bending portion 16 is represented by the following equation:

$$\phi = (d2-d1)/d2 \times 100 (\%) \tag{1}.$$

Figure 5:
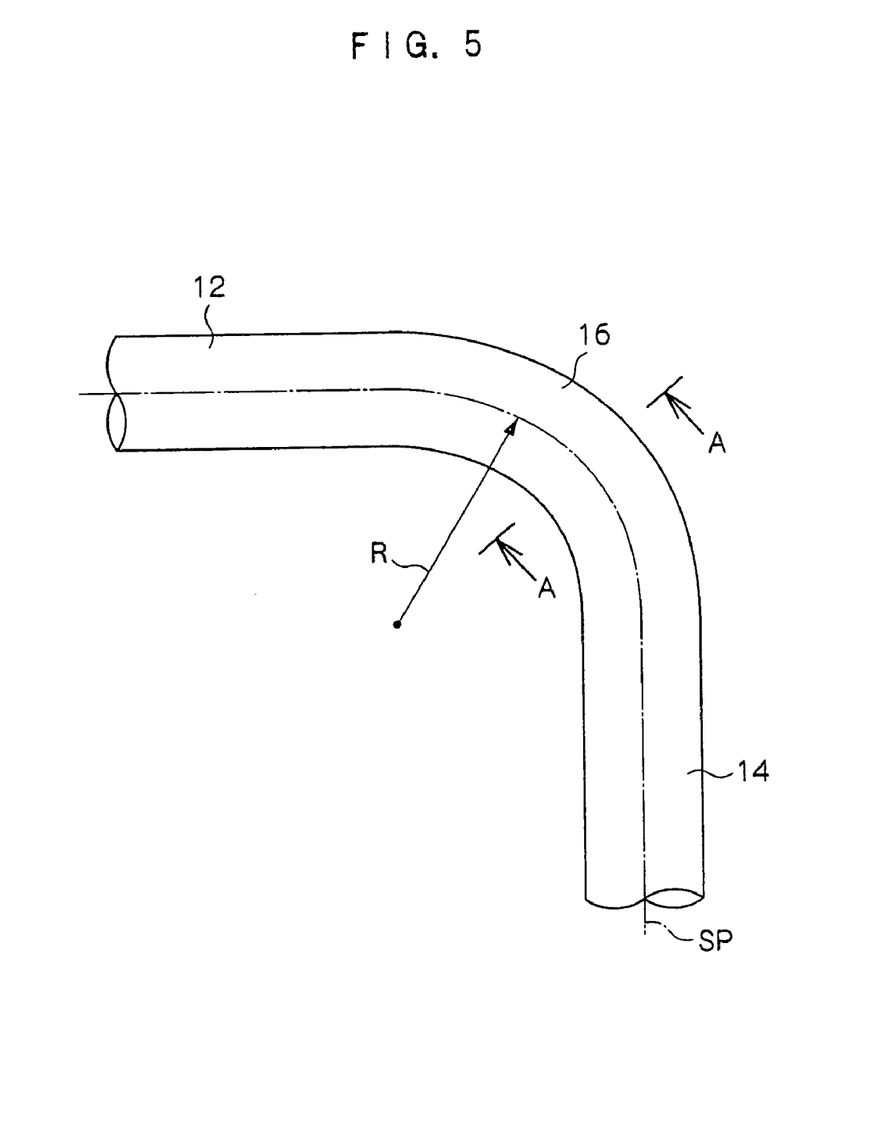
FIG. 5 is a plan view showing the structure of the bending portion of the vehicle stabilizer for high stress according to the present embodiment.

Further, the radius of bending R of the bending portion 16 is a radius of bending which is taken along the centerline SP of the bending portion 16 as shown in FIG. 5. Moreover, the material diameter d of the solid round steel bar material and the radius of bending R of the bending portion are values individually set for each of vehicle families.

Next, a description of a fatigue test will be made.

Figure 6:
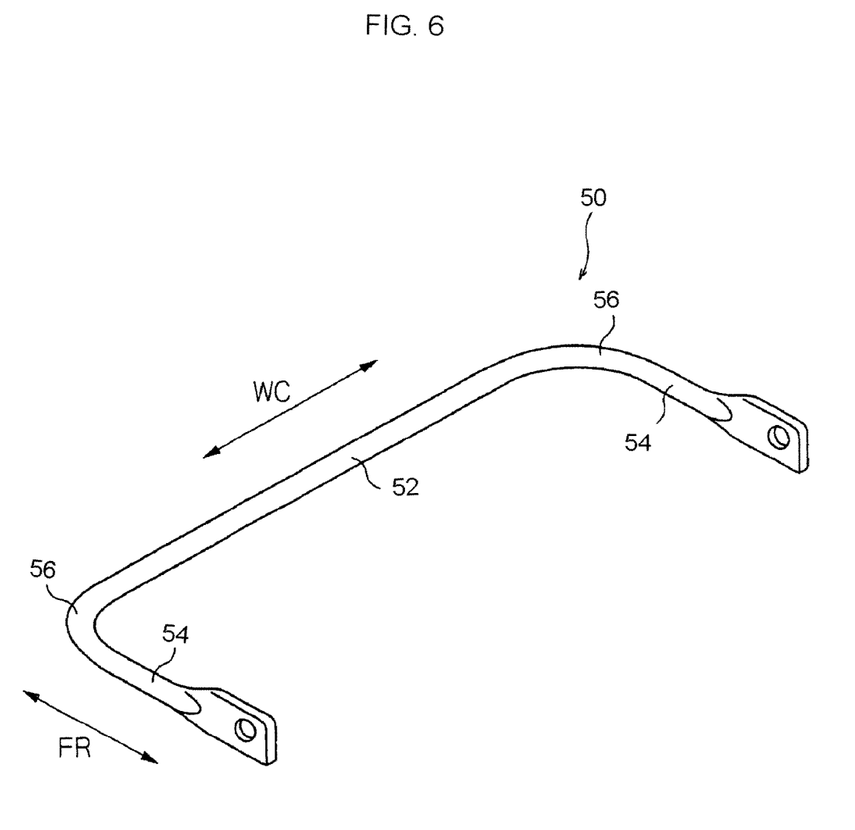
FIG. 6 is a perspective view showing a test piece applied for a fatigue test of the vehicle stabilizer for high stress according to the present embodiment.

FIG. 6 shows a perspective view of a test piece 50 which was employed for a fatigue test of the stabilizer 10 according to the present embodiment. The test piece 50 was made such that a round bar i.e., JIS spring steel material "SUP9" having a predetermined material diameter was subjected to a hot-bending process, and formed into a substantially U shape, and was immediately subjected to a quench-and-temper process. A length of a torsion portion 52 was set to 800 mm, and a length of each of arm portions 54 at both sides was set to 400 mm. At this time, as seen from table 1 shown below, sixteen test pieces 50 in total, numbered from A1 to A8 and from B1 to B8, were prepared by varying a bending portion 56 of each of the test pieces 50 in shapes (values of the radius of bending R, the flat rate φ of the cross section, and the like). Further, although it is not shown, at the bending portions 56 of the test pieces 50, in the same manner as the bending portion 16 of the stabilizer 10, tool marks were formed during the hot-bending process.

TABLE 1

| No. | material diameter d (mm) | radius of bending R (mm) | d/R | short axis dimension d1 (mm) | long axis dimension d2 (mm) | flat rate φ (%) | φ × d/R | remarks |
|---|---|---|---|---|---|---|---|---|
| A1 | 23 | 65 | 0.35 | 22.8 | 23.0 | 0.87 | 0.31 | Present |
| A2 | 23 | 45 | 0.51 | 22.6 | 23.0 | 1.74 | 0.89 | Invention |
| A3 | 26 | 65 | 0.40 | 25.7 | 26.0 | 1.15 | 0.46 | |
| A4 | 26 | 45 | 0.58 | 25.5 | 26.0 | 1.92 | 1.11 | |
| A5 | 23 | 65 | 0.35 | 22.8 | 23.0 | 0.87 | 0.31 | |
| A6 | 23 | 45 | 0.51 | 22.6 | 23.0 | 1.74 | 0.89 | |
| A7 | 26 | 65 | 0.40 | 25.7 | 26.0 | 1.15 | 0.46 | |
| A8 | 26 | 45 | 0.58 | 25.5 | 26.0 | 1.92 | 1.11 | |
| B1 | 23 | 65 | 0.35 | 21.8 | 23.0 | 5.22 | 1.85 | Comparative |

TABLE 1-continued

| No. | material diameter d (mm) | radius of bending R (mm) | d/R | short axis dimension d1 (mm) | long axis dimension d2 (mm) | flat rate φ (%) | φ × d/R | remarks |
|---|---|---|---|---|---|---|---|---|
| B2 | 23 | 45 | 0.51 | 21.6 | 23.0 | 6.09 | 3.11 | Example |
| B3 | 26 | 65 | 0.40 | 24.5 | 26.0 | 5.77 | 2.31 | |
| B4 | 26 | 45 | 0.58 | 24.3 | 26.0 | 6.54 | 3.78 | |
| B5 | 23 | 65 | 0.35 | 21.8 | 23.0 | 5.22 | 1.85 | |
| B6 | 23 | 45 | 0.51 | 21.6 | 23.0 | 6.09 | 3.11 | |
| B7 | 26 | 65 | 0.40 | 24.5 | 26.0 | 5.77 | 2.31 | |
| B8 | 26 | 45 | 0.58 | 24.3 | 26.0 | 6.54 | 3.78 | |

As shown in table 1, the test pieces 50 numbered from A1 to A8 are formed in a state that shapes of the bending portions 56 suffice conditions: $0<\varphi\leq4$, and $(\varphi\times d/R)\leq2$ (the present invention). In other words, each of the bending portions 56 of the test pieces 50 numbered from A1 to A8 is equivalent to the bending portion 16 of the stabilizer 10. On the other hand, the test pieces 50 numbered from B1 to B8 are formed in a state in which shapes of the bending portions 56 do not suffice the conditions: $0<\varphi\leq4$, and $(\varphi\times d/R)\leq2$ (the comparative example). On the other hand, a method for a fatigue test is such that the torsion portion 52 of the test piece 50 is supported at two points thereof, one of the arm portions 54 is horizontally fixed, the other is repeatedly connected via a rotational pin to a test device, a repeated vertical load is applied to the other arm portion 54, and the number of load applications (repetitions), at which number the bending portion 56 between the other of the arm portions 54 and the torsion portion 52 is broken, is counted. Moreover, two types of stresses that are applied to the arm portion 54 of the test piece 50 were 500 MPa and 800 MPa, respectively. The test pieces 50 numbered from A1 to A4 and B1 to B4 are provided for the test under the stress of 500 MPa, and the test pieces 50 numbered A5 to A8 and B5 to B8 are provided for the test under the stress of 800 MPa. Further, an angle at which the other arm portion 54 is bent was set within a range of from 90 to 100 degrees.

Here, measurement results from the fatigue test under the stress of 550 MPa are shown in table 2.

TABLE 2

| No. | flat rate φ (%) | φ × d/R | number of repetitions of breakage (_0,000 times) | remarks |
|---|---|---|---|---|
| A1 | 0.87 | 0.31 | 33.8 | Present Invention |
| A2 | 1.74 | 0.89 | 30.5 | |
| A3 | 1.15 | 0.46 | 31.5 | |
| A4 | 1.92 | 1.11 | 29.5 | |
| B1 | 5.22 | 1.85 | 13.5 | Comparative Example |
| B2 | 6.09 | 3.11 | 15.2 | |
| B3 | 5.77 | 2.31 | 14.6 | |
| B4 | 6.54 | 3.78 | 13.7 | |

Figure 7:
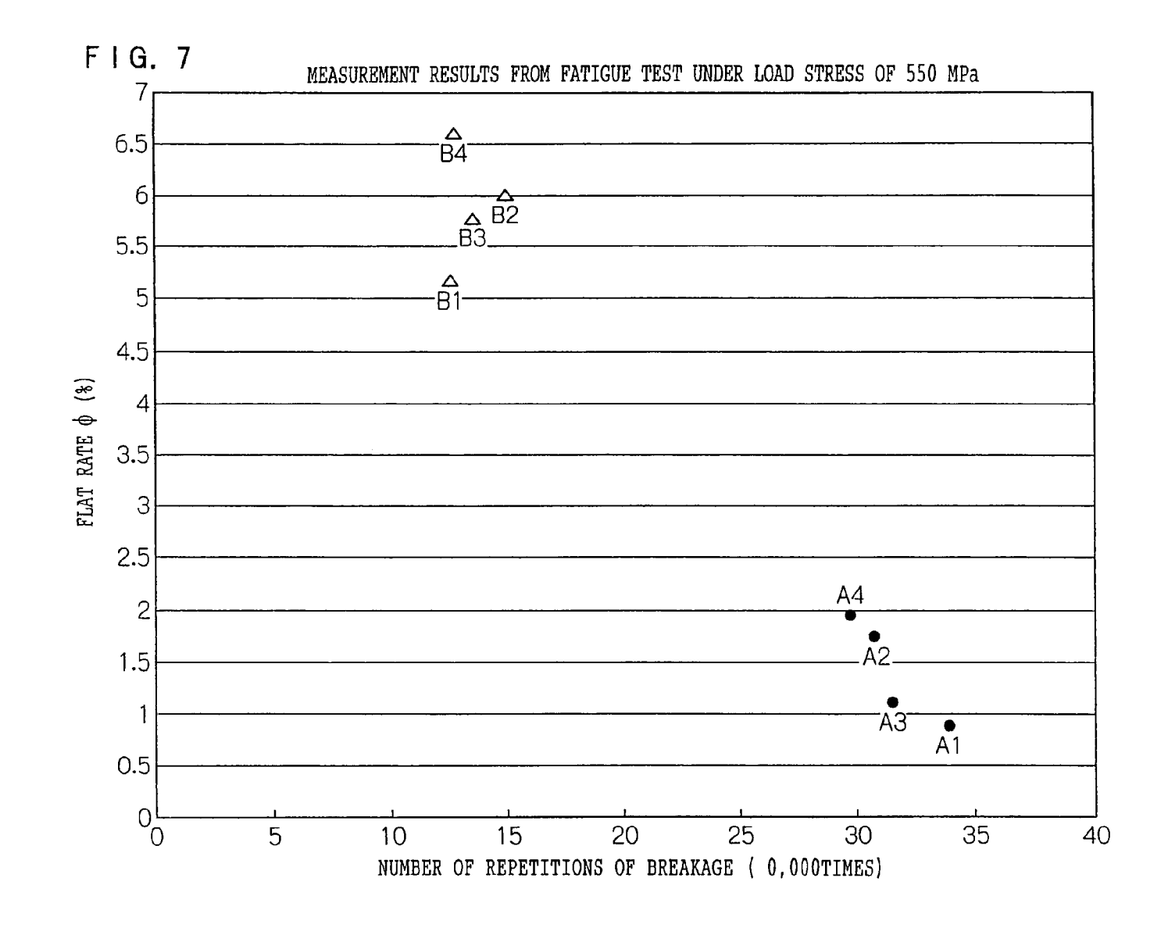
FIG. 7 is a graph illustrating a relationship between a flat rate φ and the number of repetitions of breakage in a case in which stress is 550 MPa.
Figure 8:
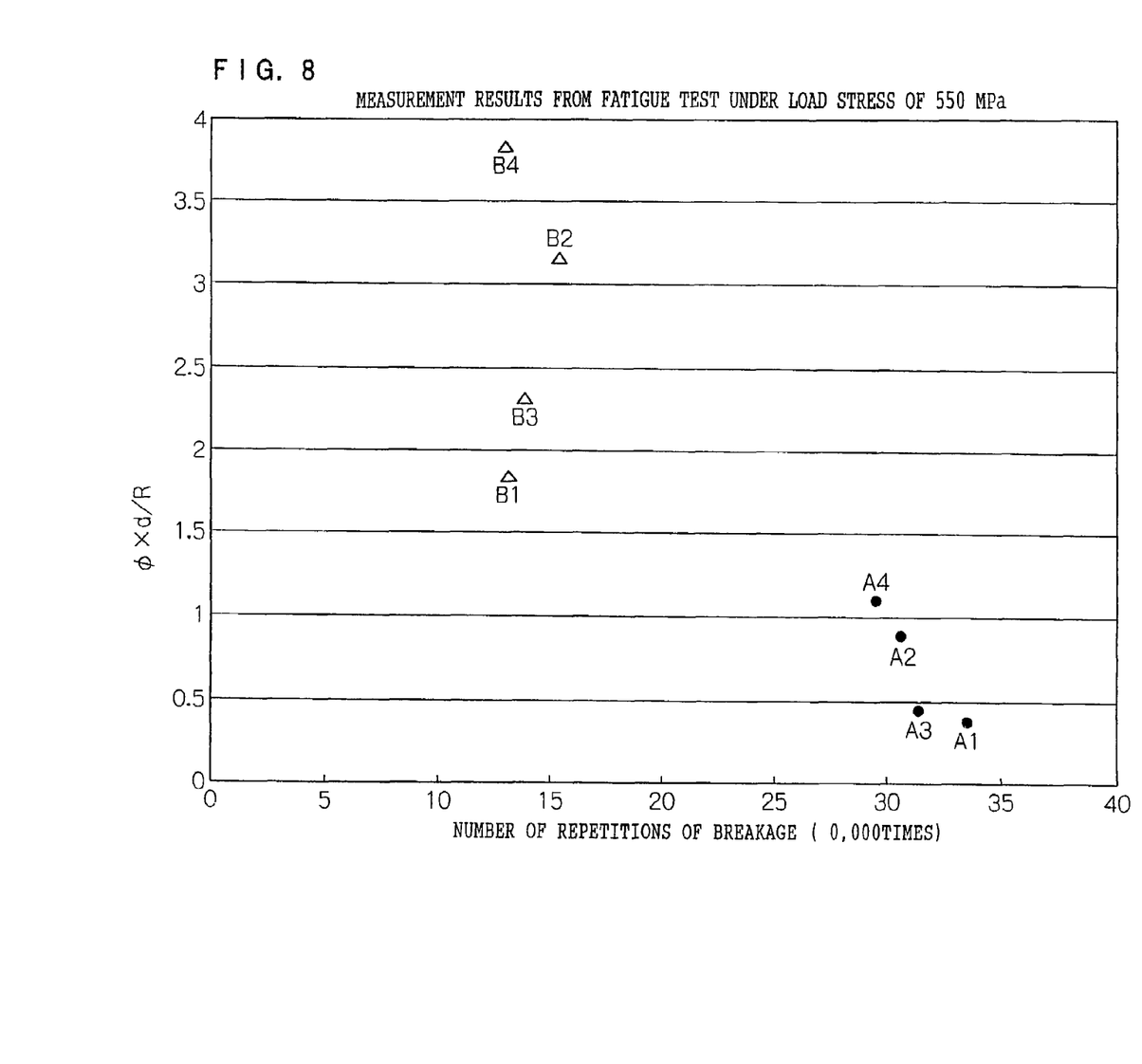
FIG. 8 is a graph illustrating a relationship between (a flat rate φ×a material diameter d/radius of bending R) and the number of repetitions of breakage in a case in which stress is 550 MPa.

Further, a graph of relationship between the flat rate φ and the number of repetitions of breakage (the number of repetitions at a time of breakage) in table 2 is shown in FIG. 7, and a graph of relationship between (φ×d/R) and the number of repetitions of breakage in table 2 is shown in FIG. 8. Moreover, in FIGS. 7 and 8, ● marks express measurement results from the test pieces 50 (numbered from A1 to A4) in which the configurations of the bending portions 56 suffice the conditions: $0<\varphi\leq4$, and $(\varphi\times d/R)\leq2$, and Δ marks express measurement results from the test pieces 50 (numbered from B1 to B4) in which the configurations of the bending portions 56 do not suffice the conditions: $0<\varphi\leq4$, and $(\varphi\times d/R)\leq2$. On the basis of table 2, and FIGS. 4 and 5, under the load stress of 550 MPa, regarding the test pieces 50 (numbered from A1 to A4), in which the configurations of the bending portions 56 suffice both conditions: $0<\varphi\leq4$, and $(\varphi\times d/R)\leq2$, it is revealed that the number of repetitions of breakage is 295,000 times or more. On the other hand, under the load stress of 550 MPa, regarding the test pieces 50 (numbered from B1 to B4), in which the configurations of the bending portions 56 do not suffice the conditions: $0<\varphi\leq4$, and $(\varphi\times d/R)\leq2$, it is revealed that the number of repetitions of breakage are 1 52,000 times or less.

Consequently, under the stress of 550 MPa, as long as the bending portion 56 is formed into a configuration that suffices both conditions: $0<\varphi\leq4$, and $(\varphi\times d/R)\leq2$, it is noted that the number of repetitions of breakage (fatigue life) of the bending portion 56 increases rapidly.

Next, measurement results from the fatigue test under the stress of 800 MPa are shown in table 3.

TABLE 3

| No. | flat rate φ (%) | φ × d/R | number of repetitions of breakage (_0,000 times) | remarks |
|---|---|---|---|---|
| A5 | 0.87 | 0.31 | 3.2 | Present Invention |
| A6 | 1.74 | 0.89 | 3.7 | |
| A7 | 1.15 | 0.46 | 4.5 | |
| A8 | 1.92 | 1.11 | 4.0 | |
| B5 | 5.22 | 1.85 | 2.1 | Comparative Example |
| B6 | 6.09 | 3.11 | 1.5 | |
| B7 | 5.77 | 2.31 | 1.3 | |
| B8 | 6.54 | 3.78 | 1.2 | |

Figure 9:
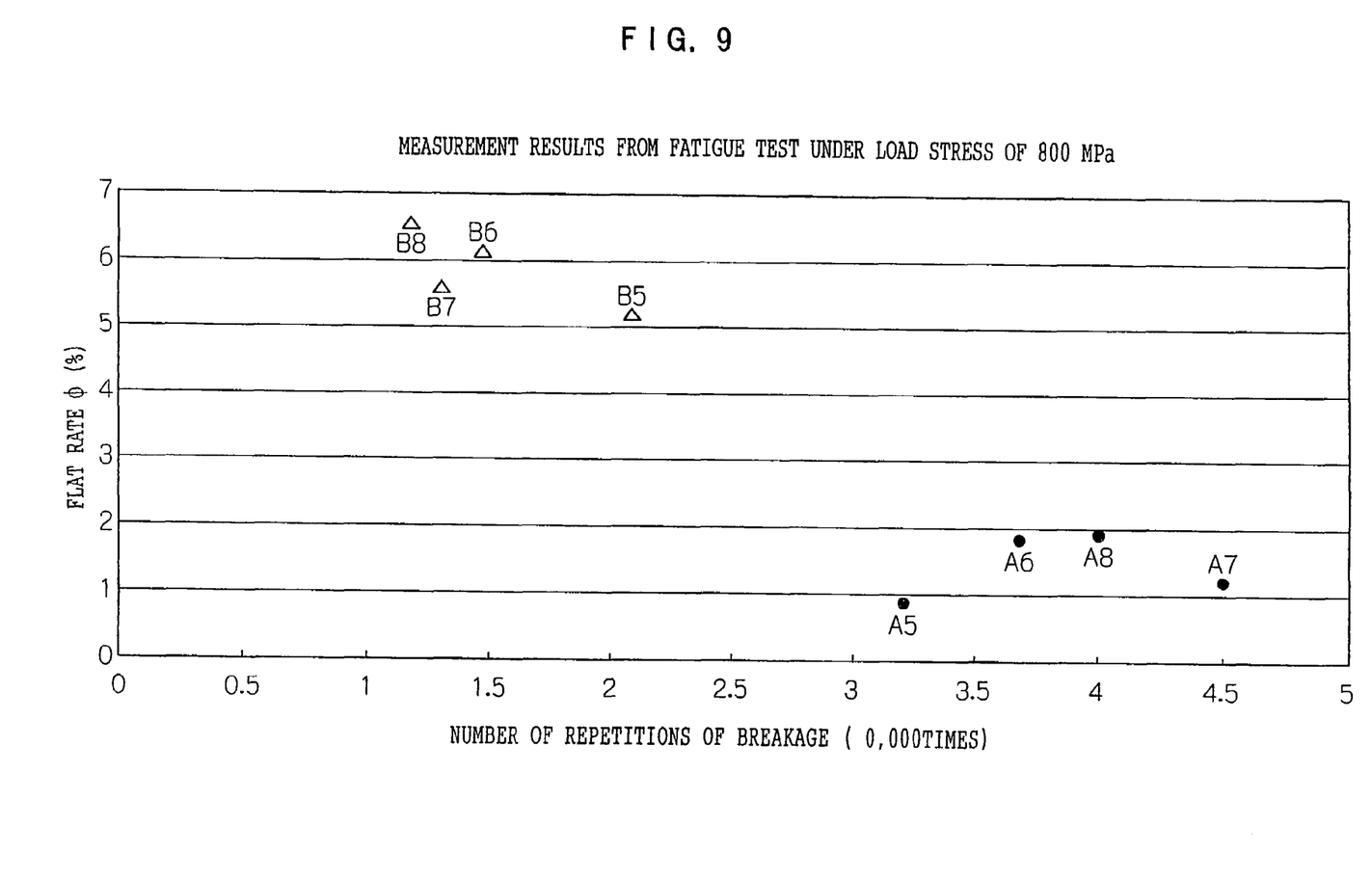
FIG. 9 is a graph illustrating a relationship between a flat rate φ and the number of repetitions of breakage in a case in which stress is 800 MPa.
Figure 10:
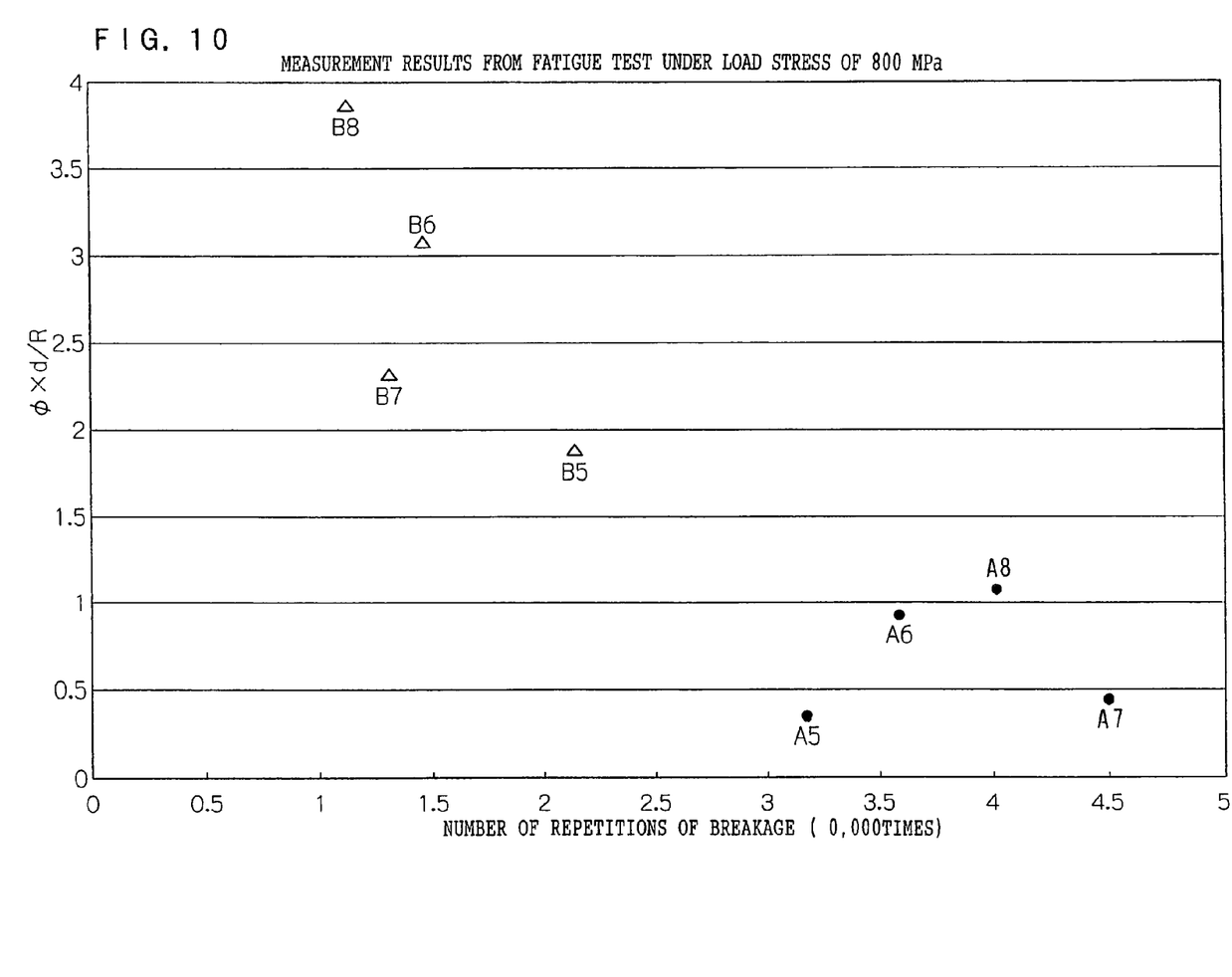
FIG. 10 is a graph illustrating a relationship between (a flat rate φ×a material diameter d/radius of bending R) and the number of repetitions of breakage in a case in which stress is 800 MPa.

Further, a graph of relationship between the flat rate φ and the number of repetitions of breakage in table 3 is shown in FIG. 9, and a graph of relationship between (φ×d/R) and the number of repetitions of breakage in table 3 is shown in FIG. 10. Moreover, in FIGS. 9 and 10, ● marks express measurement results from the test pieces 50 (numbered from A5 to A8) in which the configurations of the bending portions 56 suffice the conditions: $0<\varphi\leq4$, and $(\varphi\times d/R)\leq2$, and Δ marks express measurement results from the test pieces 50 (numbered from B5 to B8) in which the configurations of the bending portions 56 do not suffice the conditions: $0<\varphi\leq4$, and $(\varphi\times d/R)\leq2$. On the basis of table 3, and FIGS. 9 and 10, under the stress of 800 MPa, regarding the test pieces 50 (numbered from A5 to A8), in which the configurations of the bending portions 56 suffice both conditions $0<\varphi\leq4$, and $(\varphi\times d/R)\leq2$, it is revealed that the number of repetitions of breakage is 32,000 times or more. On the other hand, under the stress of 800 MPa, regarding the test pieces 50 (numbered from B5 to B8) that have the bending portions 56 whose configurations do not suffice the conditions: $0<\phi\leq4$, and $(\phi\times d/R)\leq2$, it is revealed that the number of repetitions of breakage is 21,000 times or less.

Consequently, also, under the stress of 800 MPa, as long as the bending portion 56 is formed into a state that suffices both conditions $0<\phi\leq4$, and $(\phi\times d/R)\leq2$, the number of repetitions of breakage (fatigue life) of the bending portion 56 increases rapidly.

From the above-described results, it is revealed that, in the solid stabilizer 10 which has received a heat treatment by a hot-bending process and is to be used under the stress of 500 MPa or more, the relationship among the flat rate $\phi$ of the bending portion 16, the material diameter d before the bending process, the radius of bending R of the bending portion 16 suffices both $0<\phi\leq4$ and $(\phi\times d/R)\leq2$, it is ensured that the stabilizer 10 having excellent durability can be obtained, and that the present invention can exhibit excellent efficiency.

Thus, in the vehicle stabilizer for high stress according to the present invention, fatigue life of the bending portion 16 can be increased, and durability can improve.

Further, in the aforementioned embodiment, although relationship between the configuration of the bending portion 16 of the vehicle stabilizer 10 for high stress and fragile life has been explained, the bending portions 18 and 20 are also formed so as to suffice the conditions: $0<\phi\leq4$ and $(\phi\times d/R)\leq2$.

| Description of the Reference Numerals | |
|---|---|
| 10: | vehicle stabilizer for high stress |
| 12: | torsion portion |
| 14: | arm portion |
| 16: | bending portion |
| 18: | bending portion |

| -continued | |
|---|---|
| Description of the Reference Numerals | |
| 20: | bending portion |
| 22: | tool mark |
| R: | radius of bending |
| d: | material diameter |
| d1: | short radius |
| d2: | long radius |
| $\phi$: | flat rate |
| 50: | test piece |
| 52: | torsion portion |
| 54: | arm portion |
| 56: | bending portion |

The invention claimed is:

1. A vehicle stabilizer for high stress that is formed by conducting a hot-bending process on a solid round steel bar material, wherein a bending portion is formed in a state which satisfies conditions:

$0<\phi\leq4$ and $(\phi\times d/R)\leq2$, in which d represents a material diameter of the solid round steel bar material, R represents a radius of bending of the bending portion, d1 represents a short axis dimension of a cross section of the bending portion, d2 represents a long axis dimension of the cross section of the bending portion, and a flat rate $\phi$ of the cross section of the bending portion is represented by the following equation:

$\phi=(d2-d1)/d2\times100$.

2. The vehicle stabilizer for high stress according to claim 1, wherein the vehicle stabilizer for high stress is used under stress of 500 MPa or more.

* * * * *